# 2,921,828

SURFACE TREATING POLYESTER FILMS AND FIBERS WITH PRIMARY AMINO COMPOUNDS

John R. Caldwell, Kingsport, Tenn., assignor to Eastman Kodak Company, Rochester, N.Y., a corporation of New Jersey No Drawing. Application December 3, 1956
Serial No. 625,628

19 Claims. (Cl. 8—4)

This invention relates to the surface treating of highly polymeric high melting linear polyesters substantially derived from a bifunctional hexacarbocyclic (aromatic or hydrogenated aromatic) nuclear para positioned dicarboxylic compound and a bifunctional dihydroxy compound, which polyester is in an oriented thin form such as a fiber or a film. The unoriented polyesters can also be treated in the same manner with similar results. The treating comprises contacting the thinly formed polyester at an elevated temperature with one or more primary amino compounds which are characterized by containing a —$NH_2$ radical which is connected to another nitrogen atom or a carbon atom, which carbon atom is not a nuclear aromatic carbon atom. The invention also pertains to dyeing such fibers or films with acid wool dyes or other classes of dyes. The invention also relates to coating the treated fibers or films with polymeric coating materials which contain acidic constituents, especially those derived from unsaturated organic acids. The invention further pertains to the coated polyesters or dyed polyesters which can be produced in accordance with the invention. This invention further relates to photographic film, textile fabrics, and other processes and products related to this subject matter. The polyesters with which this invention is particularly concerned include polyethylene terephthalate, poly-1,4-cyclohexanedimethylene terephthalate, polypentamethylene 4,4'-sulfonyldibenzoate, and those homologous polyesters wherein the recurring units are homologs of those just mentioned. Representative primary amino compounds include hydroxyethylamine, diethylenetriamine, hydrazine hydrate, N-monoacetyl ethylenediamine, and many others.

The problem of coating oriented thinly formed polyesters such as polyethylene terephthalate in the form of fibers and films has caused those skilled in the art a great deal of difficulty during the recent years following the original development of polyesters of this type. Numerous techniques have been devised for enhancing the dyeability or increasing the adhesive characteristics of the surfaces of such polyesters. None of the known processes has met with pronounced commercial success and all known proposed processes have aspects associated therewith that leave much to be desired. Thus, it has been necessary in some techniques to coat the polyester surface before stretching to molecularly orient the fibers or film.

The present invention provides an unexpectedly useful method for treating the surfaces of either oriented or unoriented thinly formed polyesters such as polyethylene terephthalate so as to secure surprisingly advantageous results in a relatively simple and straightforward manner which was quite unexpectedly efficacious and most unobvious when considered in the light of the prior art.

Since oriented polyester film is well known to be extremely difficult to coat or to treat with a subbing material to which a superposed coat can adhere, this invention has many practical applications. In accordance with the prior art techniques, many subcoatings show poor adhesion whereby they crack off or scale away during use. The process of this invention provides substantially improved adhesion properties with regard to certain primary coating materials as well as subbings of various types especially those containing acidic groups. The presence of amide, hydroxy and amino groups on the surface of the treated polyester film greatly improves the adhesion between the polyester and the coating material. The presence of secondary or tertiary amino groups (in addition to the primary groups which react with the polyester surface) is particularly advantageous when coating materials containing carboxyl groups are employed. Under these circumstances a salt linkage can be formed which firmly binds the coating to the polyester surface.

The prior art has disclosed the treatment of polyesters with various amino compounds which are designed to enhance dye receptivity or which react in such a way as to form a part of a dye molecule. These compounds do not include the primary amino compounds covered by the present invention nor the process employed in accordance with this invention. In fact, it would appear that the presence of primary amino groups should be avoided.

In other instances, the prior art employs amino compounds during the preparation of the polyesters so as to form polyester-amides or polyester-urethanes. Of course, such polymers are not contemplated within the scope of the present invention and are formed in such a way as to emphasize dye receptivity and thereby sacrifice some of the physical properties of the polyester. The process of the present invention uses the polyester in its most advantageous form and accomplishes dyeing and surface coating operations by employing a preliminary treatment which is essentially a surface treatment which can be applied to molecularly oriented polyesters.

It is a particular object of this invention to provide an oriented linear highly polymeric polyester surface which has improved characteristics such as reduced tendency toward static electrification, increased adherence to organic coating materials, and increased receptivity to textile dyes. It is a further object to provide a process whereby such a polyester surface can be created. It is a further object of this invention to provide coated oriented polyester films, fibers, fabrics and the like having excellent adherence between the coating and the polyester. It is an additional object of this invention to provide polyester films, fibers and fabrics which are dyed with acid wool dyes to deep shades. Other objects of this invention are apparent elsewhere herein.

According to a principal embodiment of this invention there is provided a process for surface treating a highly polymeric high melting linear polyester substantially derived from an aromatic or hydrogenated aromatic nuclear para-positioned dicarboxylic bifunctional compound condensed with a bifunctional dihydroxy compound, which polyester is generally in an oriented thin form (such as fibers and films), which process comprises contacting the formed polyester at an elevated temperature with at least one primary amino compound having no more than about 20 carbon atoms selected from the group consisting of those having the following general formula:

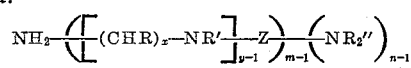

wherein $x$ represents an integer of from 1 to 10,
$y$ represents an integer of from 1 to 6,
$m$ represents an integer of from 1 to 2,
$n$ represents an integer of from 1 to 2,
$m+n$ equals 3, R represents a member selected from the group consisting of an alkyl radical, a hydroxylated alkyl radical, a hydroxy radical and a hydrogen atom, R' represents a member selected from the group consisting of an alkyl radical and a hydrogen atom, Z represents a member selected from the group consisting of a hydrogen atom, a hydroxyalkyl radical, an alkyl radical and an alkylcarbonyl radical, R'' represents a member selected from the group consisting of an alkyl radical, an aryl radical of the benzene series and a hydrogen atom, and R, R', Z and R'' each contains no more than 10 carbon atoms.

Illustrative variations covered by the above general formula include:

$$NH_2—(CHR)_3—NR'—(CHR)_3—NR'Z$$

wherein $n$ is 1, $m$ is 2, $x$ is 3 and $y$ is 3; a specific compound covered by this variation of the general formula is set forth in Example 6 wherein Z and R are H, the first occurrence of R' is $CH_3$ and the second occurrence of R' is H. Other illustrative variations include:

$$NH_2—(CHR)_3—NR'Z$$

wherein $n$ is 1, $m$ is 2, $x$ is 3 and $y$ is 2; a specific compound covered by this variation of the general formula is set forth in Example 8 wherein R' and Z are H, the first and third occurrences of R are H and the second occurrence of R is OH. Thus, it is apparent that the values of the various defined moieties such as R and R' are not necessarily the same for each occurrence in the general formula.

As a result of this process, the treated surface is characterized by reduced tendency toward static electrification, increased adherence to organic coating materials containing unneutralized acidic constituents, and increased receptivity to acid wool dyes. The latter results are effected by the fact that the primary amino compound serves to tie together the surface coating molecules or dye molecules with the molecules of the polyester by means of the formation of tying groups, such as amide groups.

The elevated temperature which can be advantageously used is generally from about 100° C. to about 200° C.; however, temperatures as low as 75° C. or lower and temperatures above 200° C. can also be employed. Of course, the maximum temperature should not be sufficiently high to degrade the polyester. At the elevated temperature the polyester fibers or films react with the primary amino compound or compounds of this invention so as to produce amide groups which form an integral part of the surface of the fiber or film. If the primary amino compound of this invention also contains a hydroxyl group or an additional amino group (including substituted amino groups), the polyester surface will have free hydroxyl groups or amino groups exposed. The amide, hydroxyl and amine groups on the surface of the polyester facilitate moisture absorption properties, surface adherence to coatings, sizing materials, finishing agents, etc., dye receptivity, etc.

The reaction of the primary amino compound with the polyester surface can be most advantageously performed in the range of 120–180° C. employing an inert solvent in order to facilitate the contact between the primary amino compound and the surface. The polyester surface can also be exposed to the vapors of the primary amino compound at a suitable temperature so as to form a deposit upon the polyester surface. The surface can then be further heated as may be required to accomplish the reaction between the surface of the polyester and the primary amino compound.

When the primary amino compound is a liquid and has a boiling point which is higher than about 150° C., the liquid may be applied directly to the polyester surface and heated at a suitable temperature below the boiling point until after the reaction has been accomplished.

An especially advantageous manner for contacting the primary amino compounds of this invention with the surface of the polyester is to dissolve the primary amino compound in an inert solvent capable of forming a solution containing from about 1 to 10% by weight of the primary amino compound. After the contacting step has been completed the inert solvent can be removed by washing or by evaporation. The use of the inert solvent is conducted so as to accomplish an increase in the weight of the polyester of from about 0.5 to about 10% on a dry basis. Inert solvents include water and most of the common organic solvents such as the alkanols, e.g. isopropyl alcohol, hexyl alcohol, etc., the hydrocarbon solvents of the aliphatic and aromatic series, e.g. heptane, xylene, etc., aliphatic ethers, e.g. dihexyl ether, aliphatic ketones, e.g. diamyl ketone, etc. Of course, the solvent employed should also be selected on the basis of its physical characteristics such as its boiling point so that it can be advantageously employed in whatever method is to be used in contacting the primary amino compound with the surface of the polyester. It is quite obvious that the chemical nature of the solvent is of no consequence as long as the solvent is inert to the extent that it does not deleteriously react with the polyester or the primary amino compound which is to be contacted with the polyester in a way which defeats the accomplishment of this invention. The inert solvent essentially serves to quite advantageously bring the primary amino compound into contact with the polyester surface.

The heating of the primary amino compound in contact with the polyester surface can be performed while the inert solvent is being evaporated or it can be performed as a separate step.

The reaction between the primary amino compound and the polyester can be quite efficaciously enhanced by incorporating an acidic condensing agent into an inert solvent in which the primary amino compound is dissolved and carrying out the reaction between the primary amino compound and the polyester prior to the evaporation or removal of the solvent. Suitable acidic condensing agents which can be advantageously employed include sulfuric acid, toluene sulfonic acid, hydrochloric acid, etc. Any of the acidic catalysts which can be employed for the condensation of esters with amines can be used in accordance with this aspect of the invention. Percentages of the acidic condensing agent which can be advantageously employed can vary over wide limits; a useful amount is generally from about 10% to about 100% by weight of the primary amino compound. Of course, smaller quantities as well as even higher proportions can also be employed, e.g. 1% can sometimes be advantageously used.

The primary amino compounds which can be employed in accordance with this invention have been broadly described in the general formula set forth above. Several examples of these compounds include ethylenediamine, 1,2-diaminopropane, 1,3-diaminopropane, hexamethylenediamine, N-ethyl ethylenediamine, N,N-dimethyl-1,3-diaminopropane, N,N-diethyl-1,4-diaminobutane, N-ethyl-1,3-diaminopropane, hydrazine, phenyl hydrazine, octylhydrazine, diethylenetriamine, triethylenetetramine, monoethanolamine, 1 - amino - propanol - 2,4 - aminobutanol, 3 - aminopropanol, 4 - aminobutanol, 3 - aminohexanol, 6-aminohexanol, 1-amino-2,3-dihydroxypropane, 3-aminobutanol, 1,3-diamino-2-propanol, N-acetylethylene diamine, N-acetyltrimethylenediamine, N-benzoyltrimethylenediamine, etc.

The process of this invention forms a surface on the polyester which is strongly substantive to many acidic materials. That is, it will absorb and hold on the surface such materials as carboxylic acids, mineral acids, acid dyes and polymeric materials that contain carboxylic acid groups or other acidic groups. This enhanced substantivity is of particular importance when the film or fabric is coated or subbed with the various materials used in photographic applications, rainproof wearing apparel, etc.

Although the primary amino compounds of this invention containing an additional amino group (which need not be a primary amino group) are most advantageously adapted to the preparation of coated fabric and films, those primary amino compounds of this invention which contain a hydroxyl group are quite advantageously adapted for treating polyester films and fibers so as to form a surface which has greatly reduced tendency to develop static electricity by friction.

The polyesters treated in accordance with this invention can be most advantageously derived from terephthalic acid, 4,4'-sulfonyldibenzoic acid, 4,4'-diphenic acid, 1,2-di(p-carboxyphenyl)-ethane, 1,2-di(p-carboxyphenoxy)-ethane, 4,4'-dicarboxy-diphenyl ether, and the various esters of these acids such as the lower alkyl diesters. These compounds can be generically grouped as hexacarbocyclic nuclear dicarboxylic bifunctional compounds wherein the carboxyl radicals are nuclearly situated in a para relationship. Such compounds can be reacted in accordance with the well-known techniques illustrated in numerous issued patents with bifunctional glycols containing from about 2 to about 10 carbon atoms. Examples of such glycols include ethylene glycol, tetramethylene glycol, pentamethylene glycol, neopentylene glycol, 1,4-cyclohexanedimethanol, quinitol, 1,4-bis(hydroxyethyl)benzene, etc. Illustrative of the more advantageous polyesters are polyethylene terephthalate, the polyester from pentamethylene glycol and 4,4-sulfonyldibenzoic acid, the polyester from 1,4-cyclohexanedimethanol and terephthalic acid and various modified polyesters related thereto, e.g. those wherein a minor proportion of an aliphatic bi-functional dicarboxylic acid is employed as a modifier.

In accordance with a primary embodiment of this invention as described above there is provided a coated polyester comprising an oriented thinly formed highly polymeric high melting linear polyester essentially derived from a hexacarbocyclic nuclear dicarboxylic compound and a dihydroxy compound, which formed polyester is coated with a highly polymeric coating material derived from the polymerization of at least one monoethylenically unsaturated organic compound containing a substantial proportion of free carboxyl radicals, said coated polyester being characterized by having a substantial proportion of said carboxyl radicals chemically bonded to surface molecules of the polyester by means of the formation of tying groups derived from a primary amino compound selected from the group consisting of those having the general formula set forth hereinabove.

Especially valuable coated polyesters of this type include those derived from polyethylene terephthalate and those derived from 1,4-cyclohexanedimethanol condensed with terephthalic acid. The coating material can be especially advantageously a copolymer containing acrylic acid or methacrylic acid in an amount of from about 10 to about 20% by weight with the balance being a lower alkyl acrylate or methacrylate. Another advantageous copolymer is that derived from maleic acid in an amount of from about 10 to 40% with the balance being vinyl acetate. Numerous other polymers and copolymers containing free carboxyl radicals can also be employed, e.g. those derived from itaconic acid, citraconic acid, etc., some of which can be illustrated by U.S. Patent 2,627,088. As already mentioned, adhesion of these copolymers is enhanced most advantageously by the employment of compounds such as hydrazine or a compound having the above general formula containing at least one secondary or tertiary amino group.

It is well known that coating materials applied in accordance with the prior art techniques on polyester surfaces have in general had poor adhesion especially when the polyester fibers or film are in a molecularly oriented state. Treatment of biaxially drafted polyester film with a primary amino compound of the general formular given above which contains a second amino group, produces a layer of amino groups on the surface of the film whereupon the film can then be coated with an acidic polymer such as polyacrylic acid so as to form a salt type linkage between the carboxyl group of the polymer and the amino group on the film surface. As a result of this interaction between the treated surface of the film and the coating containing the acidic polymer, a strong bond is formed and the tendency toward separation is greatly reduced.

Examples of acidic polymers which can be employed in accordance with this aspect of the invention so as to form coated polyester films and fabrics include acrylic, methacrylic, maleic, fumaric, and itaconic acid polymers and copolymers which contain at least 2% of compounds containing free carboxyl groups. Although this aspect of the invention primarily pertains to acidic polymers containing free carboxyl groups, other types of coating materials containing gelatin, starch, polyvinyl alcohol, polyacrylamides, etc., also show improved adhesion to the treated surfaces of this invention. It has been found that hydrazine hydrate dissolved in a lower alkanol has a particularly unexpectedly efficacious effect upon the ability of a polyester film to adhere firmly to coatings of vinyl resins containing free carboxyl groups. In fact, the discovery that hydrazine compounds can be employed as described herein is quite distinctly different from the somewhat related but in many ways chemically different compounds also covered by the general formula.

In accordance with a further embodiment of this invention there is provided a dyed polyester comprising an oriented thinly formed highly polymeric high melting linear polyester essentially derived from a hexacarbocyclic nuclear dicarboxylic compound and a dihydroxy compound, which formed polyester is dyed with an acid wool textile dye, said dyed polyester being characterized by having a substantial proportion of the dye molecules chemically bonded to the surface molecules of the polyester by means of the formation of tying groups derived from a primary amino compound selected from the group consisting of those having the general formula set forth hereinabove.

The acid wool dyes which can be most advantageously employed in accordance with this aspect of the invention are those which dye wool from a bath made acid with formic acid or sulfuric acid or the like. These dyes give level dyeings that are bright and have satisfactory fastness to light; furthermore, they are relatively inexpensive as a class. By means of this invention it is now possible to employ this class of dyes so as to satisfactorily dye polyester films and fibers in a relatively inexpensive manner. Various examples of suitable acid wool dyes are set forth in the annual editions of the Technical Manual and Yearbook of the American Society of Dyers and Colourists. Other classes of dyes as described therein can also be employed in accordance with this invention.

This invention can be further illustrated by the following examples of preferred embodiments although it will be understood that these examples are included merely for purposes of illustration and are not intended to limit the scope of the invention unless otherwise specifically indicated:

*Example 1*

Five g. of N-monoacetyl ethylenediamine was dissolved in 100 cc. of isopropyl alcohol. Into this solution there was placed 5 grams of fabric made from drafted heat-set fibers derived from melt spun polyester produced from 4,4'-sulfonyldibenzoic acid and pentanediol. The fabric was pressed out so that it contained about 5% of the primary amino compound figured, on a dry basis. The fabric was heated for 10 minutes at 150° C. in a mineral oil bath. After scouring, the fabric contained 0.23% nitrogen. The treated fabric was dyed with various acid wool dyes. The original untreated fabric had no affinity for wool dyes. The treated fabric showed a greatly reduced tendency to develop static electricity, when compared with the untreated fabric.

Example 2

Five g. of diethylenetriamine and 1 g. of toluenesulfonic acid were dissolved in 100 cc. of isopropyl alcohol. Fabric made from polyethylene terephthalate polyester fibers was soaked in the solution and pressed out to give a residue of 3% amine, on a dry basis. The fabric was heated at 150° C. for 10 minutes in mineral oil. After scouring, the fabric was dyed with acid wool dyes. The original fabric could not be dyed with acid wool dyes. The treated fabric showed a greatly reduced tendency to develop static electricity.

Example 3

A two percent solution of monoethanolamine in xylene was prepared. A fabric made from polyethylene terephthalate was boiled in the solution for 20 minutes. After scouring, the fabric contained 0.47% nitrogen by analysis. The fabric dyed well with acid wool and cellulose acetate dyes. The untreated fabric was not colored by an acid wool dye and was only tinted by a cellulose acetate dye under the same conditions.

Example 4

Films of oriented polyethylene terephthalate were boiled for 20 minutes in a 2% solution of monoethanolamine in xylene. The film contained 0.36% nitrogen by analysis. Coatings of gelatin, polyvinyl alcohol, and acrylic resins showed improved adhesion on the treated film, as compared with the untreated film. The treated film also showed a markedly reduced tendency toward developing static electricity by friction.

Example 5

Films of polyethylene terephthalate were boiled for 20 minutes in a 2% solution of N,N'-dimethyl-1,3-diaminopropane solution in xylene. The film contained 0.17% nitrogen by analysis. The film was coated or subbed with a solution of an acrylic acid copolymer in alcohol. The copolymer contained 15% acrylic acid and 85% methyl acrylate. The coating showed excellent adhesion on the treated film, whereas it separated from an untreated film after repeated flexing.

Example 6

One hundred g. of $H_2N(CH_2)_3N(CH_3)(CH_2)_3NH_2$ and 5 g. of toluenesulfonic acid were dissolved in 1000 cc. of water. The solution was applied to polyethylene terephthalate photographic film base so as to deposit 4% of the amine, based on the weight of the film. The water was evaporated and the film was heated for 10–15 minutes in a nitrogen atmosphere at 160–170° C. The film was then washed with 0.5% sodium bicarbonate solution, followed by water. The treated film dyed readily with acid wool dyes, showing that the amine was permanently attached to the surface. Coatings of gelatin, polyvinyl alcohol, and starch showed good adhesion to the treated film. Coatings of vinyl resins containing 10–20% acrylic or methacrylic acid in the polymer showed exceptionally good adhesion. A copolymer of maleic acid and vinyl acetate had good adhesion on the treated film. The coatings or subs may be applied from aqueous or organic solvent solutions.

Example 7

A solution of 10 g. of triethylenetetramine and 1 g. toluenesulfonic acid in 200 cc. of water was prepared. A fabric made of 1,2-di(p-carboxyphenoxy) ethane-ethylene glycol polyester was soaked in the solution and pressed to twice its original weight. The fabric was dried at 90–100° C. and then placed in mineral oil at 150–160° C. for 15 minutes. After scouring, the fabric could be dyed with acid wool dyes. It showed a greatly reduced tendency to develop static electricity.

Example 8

Fibers were made from a polyester having the composition 0.5 mole 4,4'-sulfonyldibenzoic acid+0.5 mole sebacic acid+1.0 mole butanediol, as described in U.S. Patent 2,744,091 issued May 1, 1956, to J. R. Caldwell. The fibers were soaked in a solution of 1,3-diamino-2-propanol and pressed to give a residue of 5% diamine, based on the fiber weight. The fibers were heated at 160–170° C. in a nitrogen atmosphere for 20 minutes. They were then washed and dried. The treated fibers could be dyed with acid wool dyes. They showed a reduced tendency to develop static electricity.

Example 9

Fibers were prepared from 1,2-di(p-carboxyphenyl) ethane-ethylene glycol polyester. They were boiled for 20 minutes in a 3% solution of N,N-dimethyl-hexamethylenediamine. They dyed well with acid wool dyes.

Example 10

Photographic film base made from biaxially oriented polyethylene terephthalate was refluxed for 20 minutes in a 3% solution of hydrazine hydrate in butyl alcohol. The films dyed with acid wool dyes, showing that combined hydrazine was present. Coatings of vinyl resins containing free carboxyl groups showed especially good adhesion on the treated film.

Example 11

Fabrics and films prepared from oriented extruded polymeric 1,4-cyclohexanedimethanol terephthalate and modifications thereof employing a minor proportion of glutaric acid were prepared as described in Kibler et al. application Serial No. 554,639 filed December 22, 1955, and they were treated in the same manner as in Examples 1, 2, 3, 4 and 10 set forth above with similar excellent results.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A process for surface treating a highly polymeric high melting linear synthetic polyester substantially derived from a bifunctional hexacarbocyclic nuclear para positioned dicarboxylic compound and a bifunctional dihydroxy compound, which polyester is in an oriented thin form, which process comprises contacting the formed polyester at an elevated temperature with at least one primary amino compound selected from the group consisting of those having the following general formula:

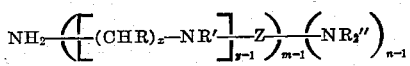

wherein x represents an integer of from 1 to 10,
y represents an integer of from 1 to 6,
m represents an integer of from 1 to 2,
n represents an integer of from 1 to 2,
m+n equals 3,
R represents a member selected from the group consisting of an alkyl radical, a hydroxylated alkyl radical, a hydroxy radical and a hydrogen atom,
R' represents a member selected from the group consisting of an alkyl radical and a hydrogen atom,
Z represents a member selected from the group consisting of a hydrogen atom, a hydroxyalkyl radical, an alkyl radical and an alkylcarbonyl radical,
R'' represents a member selected from the group consisting of an alkyl radical, an aryl radical of the benzene series and a hydrogen atom, and R, R', Z and R" each contains no more than 10 carbon atoms, whereby the treated surface is characterized by reduced tendency toward static electrification, increased adherence to organic coating materials containing carboxyl radicals, and increased receptivity to acid wool dyes.

2. A process as defined in claim 1 wherein the primary amino compound has the formula:

$$NH_2-CH_2-CH_2-NH-CO-CH_3$$

3. A process as defined in claim 1 wherein the primary amino compound has the formula:

$$NH_2-(CH_2)_2-NH-(CH_2)_2-NH_2$$

4. A process as defined in claim 1 wherein the primary amino compound has the formula:

$$NH_2-(CH_2)_2-OH$$

5. A process as defined in claim 1 wherein the primary amino compound has the formula:

$$NH_2-(CH_2)_3-N(CH_3)_2$$

6. A process as defined in claim 1 wherein the primary amino compound has the formula:

$$NH_2-(CH_2)_3-N(CH_3)-(CH_2)_3-NH_2$$

7. A process as defined in claim 1 wherein the elevated temperature is from about 100° to about 200° C.

8. A process as defined in claim 1 wherein the primary amino compound is contacted with the formed polyester as a solution dissolved in an inert solvent capable of forming a solution containing from about 1 to 10 percent by weight of the primary amino compound, after which the inert solvent is removed, whereby the weight of the formed polyester is increased from about 0.5 to about 10 percent on a dry basis.

9. A process as defined in claim 1 wherein the inert solvent contains from 0.1 to 10 percent by weight an acidic condensing agent capable of catalyzing condensation between the primary amino compound and the polyester.

10. A process as defined in claim 1 wherein the formed polyester is a fiber of polyethylene terephthalate.

11. A process as defined in claim 1 wherein the formed polyester is a film of polyethylene terephthalate.

12. A coated polyester comprising an oriented thinly formed highly polymeric high melting linear polyester essentially derived from a hexacarbocyclic nuclear dicarboxylic compound and a dihydroxy compound, which formed polyester is coated with a highly polymeric coating material derived from the polymerization of at least one monoethylenically unsaturated organic compound containing a substantial proportion of free carboxyl radicals, said coated polyester being characterized by having a substantial proportion of said carboxyl radicals chemically bonded to surface molecules of the polyester by means of the formation of tying groups derived from a primary amino compound selected from the group consisting of those having the following formula:

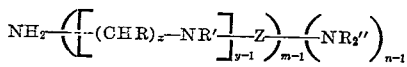

wherein $x$ represents an integer of from 1 to 10,
$y$ represents an integer of from 1 to 6,
$m$ represents an integer of from 1 to 2,
$n$ represents an integer of from 1 to 2,
$m+n$ equals 3,
R represents a member selected from the group consisting of an alkyl radical, a hydroxylated alkyl radical, a hydroxy radical and a hydrogen atom, R' represents a member selected from the group consisting of an alkyl radical and a hydrogen atom, Z represents a member selected from the group consisting of a hydrogen atom, a hydroxyalkyl radical, an alkyl radical and an alkylcarbonyl radical, R" represents a member selected from the group consisting of an alkyl radical, an aryl radical of the benzene series and a hydrogen atom, and R, R', Z and R" each contains no more than 10 carbon atoms.

13. A coated polyester as defined in claim 12 wherein the polyester is polyethylene terephthalate, the coating material is a copolymer of from about 10 to 20 percent of a monoethylenically unsaturated compound containing carboxyl radicals selected from the group consisting of acrylic acid and methacrylic acid and from 90 to 80 percent by weight of a monoethylenically unsaturated organic carboxylic acid ester consisting of methyl acrylate and methyl methacrylate, and the primary amino compound is N,N-dimethyl-1,3-diaminopropane.

14. A coated polyester as defined in claim 12 wherein the polyester is poly(1,4-cyclohexanedimethylene terephthalate), the coating material is a copolymer of a maleic acid and vinyl acetate, and the primary amino compound is hydrazine.

15. A dyed polyester comprising an oriented thinly formed highly polymeric high melting linear polyester essentially derived from a hexacarbocyclic nuclear dicarboxylic compound and a dihydroxy compound, which formed polyester is dyed with an acid wool textile dye, said dyed polyester being characterized by having a substantial proportion of the dye molecules chemically bonded to the surface molecules of the polyester by means of the formation of tying groups derived from a primary amino compound selected from the group consisting of those having the following formula:

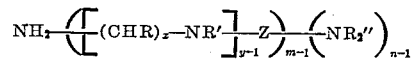

wherein $x$ represents an integer of from 1 to 10,
$y$ represents an integer of from 1 to 6,
$m$ represents an integer of from 1 to 2,
$n$ represents an integer of from 1 to 2,
$m+n$ equals 3,
R represents a member selected from the group consisting of an alkyl radical, a hydroxylated alkyl radical, a hydroxy radical and a hydrogen atom, R' represents a member selected from the group consisting of an alkyl radical and a hydrogen atom, Z represents a member selected from the group consisting of a hydrogen atom, a hydroxyalkyl radical, an alkyl radical and an alkylcarbonyl radical, R" represents a member selected from the group consisting of an alkyl radical, an aryl radical of the benzene series and a hydrogen atom, and R, R', Z and R" each contains no more than 10 carbon atoms.

16. A dyed polyester as defined in claim 15 wherein the polyester is polyethylene terephthalate and the primary amino compound is diethylenetriamine.

17. A dyed polyester as defined in claim 15 wherein the polyester is polyethylene terephthalate and the primary amino compound is monoethanolamine.

18. A dyed polyester as defined in claim 15 wherein the polyester is poly(1,4-cyclohexanedimethylene terephthalate) and the primary amino compound is N-monoacetyl ethylenediamine.

19. A dyed polyester as defined in claim 15 wherein the polyester is poly(1,4-cyclohexanedimethylene terephthalate) and the primary amino compound is hydrazine.

(References on following page)

References Cited in the file of this patent

UNITED STATES PATENTS

| | | |
|---|---|---|
| 2,188,160 | Rooney | Jan. 23, 1940 |
| 2,260,543 | Smith | Oct. 28, 1941 |
| 2,533,100 | Flugel | Dec. 5, 1950 |
| 2,540,726 | Graham | Feb. 6, 1951 |
| 2,647,104 | Shivers | July 28, 1953 |
| 2,717,842 | Vitalis | Sept. 13, 1955 |
| 2,803,563 | Steiger | Aug. 20, 1957 |
| 2,805,173 | Ambler | Sept. 3, 1957 |
| 2,805,963 | Gaylord | Sept. 10, 1957 |